Patented Apr. 10, 1928.

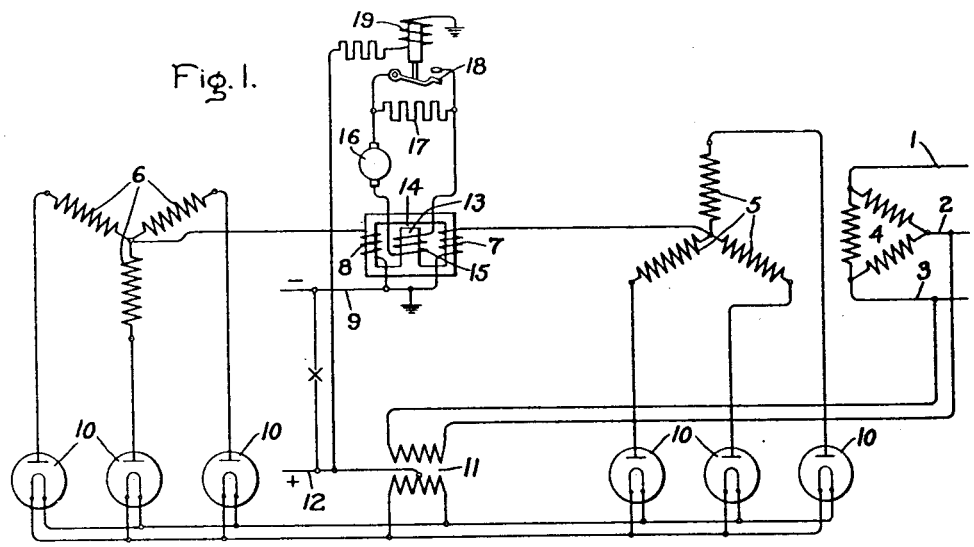

1,665,893

UNITED STATES PATENT OFFICE.

DAVID C. PRINCE, OF SCHENECTADY, NEW YORK, ASSIGNOR TO GENERAL ELECTRIC COMPANY, A CORPORATION OF NEW YORK.

SYSTEM OF DISTRIBUTION.

Application filed September 23, 1924. Serial No. 739,443.

My present invention relates to systems of electrical distribution, and more particularly to systems in which electrical energy of one form is received and converted to electrical energy of another form.

The object of my invention is to provide a means for regulating the voltage in a system of the class mentioned in such a way that the voltage at which the converted energy is supplied to a consumption circuit may be maintained substantially constant over wide variations in the load.

My invention is applicable both to systems for converting direct current to alternating current and systems for converting alternating current to direct current.

The novel features which I believe to be characteristic of my invention are set forth with particularity in the appended claims; my invention itself, however, both as to its organization and method of operation will best be understood by reference to the following description taken in connection with the accompanying drawing in which Fig. 1 shows diagrammatically a circuit arrangement which may be used in carrying my invention into effect in a system for converting alternating current to direct current, and Fig. 2 is a diagrammatic representation of a circuit arrangement in which my invention is applied to a system for converting direct current to alternating.

In the arrangement shown in Fig. 1, I have indicated three-phase alternating current supply conductors 1, 2 and 3 which supply current to the delta connected primary windings 4 of a transformer. Current is supplied from the primary windings 4 to the double Y-connected windings 5 and 6. The neutral points of the windings 5, 6 are connected through the windings 7, 8 of an interphase transformer to the negative side 9 of a direct current consumption circuit. The other terminals of windings 5, 6 are all connected to a series of rectifying valves 10, which in the present instance are indicated as of the thermionic type, but which may be any type of rectifier desired. The cathods of all of these valves or rectifiers are connected in parallel and supplied with heating current by means of the transformer 11, which receives current from the supply conductors 2, 3. The positive terminal 12 of the direct current distribution circuit is connected to the central point of secondary 11.

A wave analysis of various rectifier connections shows that the effect of an interphase transformer is always to eliminate the same harmonics as are eliminated by the corresponding number of phases without the interphase transformer. The average direct current component, however, is different. For any polyphase combination the average direct current component is greater without the interphase transformer.

I propose to make use of this phenomenon in order to maintain substantially constant the output voltage supplied over a wide range of load. This result may be brought about in various ways. In the arrangement shown in Fig. 1, the interphase transformer is provided with a third leg 13, having an air gap 14. This third leg is wound with a saturating winding 15, which is excited by the generator 16 through a resistance 17. An increase in the current supplied to the load circuit would normally be accompanied by a drop in voltage at the terminals 9 and 12. However, such an increase in direct current would cause a unidirectional flux to pass through the third leg 13 of the interphase transformer saturating the transformer, and to all practical purposes eliminating the effect of the interphase transformer from the system and causing it to operate as a straight six-phase rectifier instead of a double three-phase rectifier. As a result, the average direct current voltage will rise. With the combination shown in Fig. 1, the rise in the direct current voltage produced by change from double three-phase to straight six-phase operation is proportional to the ratio of .995 to .827. This inherent voltage rise does not take place instantly, but is progressive between the point where the interphase transformer is fully effective and the point where its effect is entirely eliminated.

When the load taken is light and the direct current voltage up to its maximum, the resistance 17 is short circuited by the contact 18 being held up by the coil 19. As soon as the voltage starts to fall the coil 19 releases contact 18 and the resistance 17 is then included in the saturation current circuit. The current in the saturating coil 15 is such that it opposes the passage of the unidirectional flux from winding 7 and 8 through the middle leg of the interphase transformer. The reduction in the current through coil 15 caused by the opening of contact 18 therefore permits an increase in the saturating flux which in turn produces an increase in the output voltage. By suitable design of the saturation transformer and the windings 7 and 8 the desired regulating effect may be obtained without the use of an extra source of saturating current.

Similar arrangements may be used with a triple single-phase rectifier or a quarter-phase rectifier. In the case of the triple-single-phase rectifier the increase in voltage due to saturation of the interphase transformer is in the ratio of .995 to .637. In the case of the quarter-phase rectifier the ratio of voltage increase is .900 to .637.

In Fig. 2 I have indicated the application of my invention to a system for converting direct current to alternating. In this case, direct current is supplied from the conductors 20, 21, to the two Y-connected sets of primary windings 22 and 23. Current is supplied from the positive line 20 through the windings 24 and 25 of an interphase transformer, and the windings 22 and 23 are connected to the anodes of a series of valves 26 of the thermionic three-electrode type, altho other types of valves for controlling the flow of current to windings 22 and 23 may be employed if desired. The secondary windings 27 supply current to the alternating current distribution mains 28. The winding 29 on the middle leg of the interphase transformer is supplied with saturating current by the source 31, which also supplies saturating current to a winding 32 on the middle leg of the interphase transformer for the grid circuits of valves 26. Excitation for the grids is obtained by placing the windings 34 and 35 in the grid circuits in inductive relation to the windings 22 and 23 respectively. The interphase transformer in the plate circuits is provided with the air gap 30 as indicated in order that it shall have normally a fairly high exciting current so that at light loads the system functions as though the interphase transformer was omitted while under heavier loads the effect of the interphase transformer goes into operation, and the system has a correspondingly higher inherent output voltage. In addition to this inherent effect, current is supplied to the saturating winding 29 in such a way that the flow of current through windings 24 and 25 normally assists in saturating the core. When the output voltage is low, the contact at 33 opens and reduces the saturating current. The effect of this is to cause the apparatus to be more effectively a double three-phase apparatus with correspondingly higher output voltage. The two effects are cumulative and may be used separately or together the same as in the case of the rectifier.

At the same time that the plate circuit changes from three- to six-phase operation the grid circuit must also make a similar change. This is brought about by saturation effects in the interphase transformer. At light loads the grid current tends to be larger than at heavy loads. This larger grid current tends to saturate the interphase transformer through the third leg of the interphase transformer core. This renders the interphase transformer ineffective and makes the grids operate six-phase just as the plates are doing. At the same time, if an increase in voltage closes the contact 33 and increases the current in the saturation winding this current will saturate the grid interphase transformer. This change is also in the direction of converting the grid circuit into a straight six-phase circuit to conform with the changes being brought about in the plate circuit.

What I claim as new and desire to secure by Letters Patent of the United States, is,—

1. The combination in a system of electrical distribution of a direct current circuit and an alternating current circuit, a load connected to one of said circuits and a source of current connected to the other circuit, means interconnecting said circuits comprising a pair of windings on a single magnetic core, means comprising a source of current arranged to maintain a predetermined degree of magnetic saturation in said core, and means operable to regulate the saturation of said core in response to change in the voltage of said direct current circuit.

2. The combination in a system of electrical distribution of a direct current circuit and an alternating current circuit, a load connected to one of said circuits, and a source of current connected to the other circuit, means interconnecting said circuits comprising a pair of windings on a magnetic core, a third winding on said core, means for supplying to said third winding a predetermined saturating current, and means operable to regulate the current of said third winding in accordance with the voltage of said direct current circuit.

3. The combination in a system of electrical distribution of a direct current circuit and an alternating current circuit, a load connected to one of said circuits and a source of current connected to the other circuit, means interconnecting said circuits comprising a pair of windings on a magnetic core, a third winding on said core, and means for supplying to said third winding a predetermined saturating current, the saturating current thus supplied being so chosen that the current supplied to the load will act in conjunction therewith to produce a predetermined variation in the saturation of the core, which will maintain substantially constant the voltage of the load circuit over a wide range in the load current, and supplemental means responsive to variations in voltage in the load circuit for varying the current supplied to the third winding and thereby assisting in maintaining constant the voltage of the load circuit.

4. The combination in a system of electrical distribution of a direct current circuit and an alternating current circuit, a load connected to one of said circuits and a source of current connected to the other circuit, means interconnecting said circuits comprising a pair of windings on a magnetic core, a third winding on said core, a source of current connected to said third winding through means comprising an impedance device, and means operable to control the connections of said device in accordance with the voltage of said direct current circuit.

5. The combination in a system of electrical distribution of a direct current circuit and an alternating current circuit, a load connected to one of said circuits and a source of current connected to the other circuit, means interconnecting said circuits comprising a pair of windings on a magnetic core, a third winding on said core, means for supplying to said third winding a predetermined saturating current, and means responsive to variations in voltage in the load circuit for varying the current supplied to the third winding and producing thereby such variation in the saturation of the core as to maintain substantially constant the voltage of the load circuit over a wide range in the load current.

6. The combination in a system of electrical distribution of a direct current circuit and an alternating current circuit, a load connected to one of said circuits and a source of current connected to the other circuit, means interconnecting said circuits comprising a pair of windings on a magnetic core, said windings being connected individually to two separate sets of windings associated with the alternating current circuit, and means independent of the current supplied to the load for producing a predetermined degree of saturation of the magnetic core, said last mentioned means being arranged to act in conjunction with the current supplied to the load to maintain substantially constant the voltage of the load circuit over a wide range in the load current.

7. The combination in a system of electrical distribution of a direct current circuit and an alternating current circuit, a load connected to one of said circuits and a source of current connected to the other circuit, means interconnecting said circuits comprising a pair of windings on a magnetic core, said windings being connected individually to two separate sets of windings associated with the alternating current circuit, a third winding on said core and means for supplying to said third winding a predetermined saturating current, the saturating current thus supplied being so chosen that the current supplied to the load will act in conjunction therewith to produce a predetermined variation of the saturation of the core which will maintain substantially constant the voltage of the load circuit over a wide range in the load current.

8. The combination in a system of electrical distribution of a direct current circuit and an alternating current circuit, a load connected to one of said circuits and a source of current connected to the other circuit, means interconnecting said circuits comprising a pair of windings on a magnetic core, said windings being connected individually to two separate sets of windings associated with the alternating current circuit, said core and the windings thereon being so constructed and proportioned that the saturation of the core varies with the load current in such a way that the voltage of the load circuit is maintained substantially constant while the load current varies in value.

9. The combination of polyphase windings, a direct current circuit, an interphase transformer comprising a magnetic core and windings wound on said core and connected between said direct current circuit and said polyphase windings, and means operable in accordance with the voltage of said direct current circuit for varying the saturation of said core to regulate the relation between the voltages of said polyphase windings and said direct current circuit.

10. The combination of polyphase windings, a direct current circuit, an interphase transformer comprising a magnetic core and windings wound on said core and connected between one side of said direct current circuit and said polyphase windings, means connected between said polyphase windings and the other side of said direct current circuit for rectifying the current transmitted between said polyphase windings and said direct current circuit, and means operable in accordance with the voltage of said direct current circuit for varying the saturation of said core to regulate the relation between the voltages of said polyphase windings and said direct current circuit.

In witness whereof, I have hereunto set my hand this 22nd day of September, 1924.

DAVID C. PRINCE.